(12) United States Patent
Padgett

(10) Patent No.: US 7,066,644 B2
(45) Date of Patent: Jun. 27, 2006

(54) APPAREL INDICATING THERMOMETER

(76) Inventor: Lauren M. Padgett, 808 Evergreen Rd., Magnolia, DE (US) 19962

( * ) Notice: Subject to any disclaimer, the term of this patent is extended or adjusted under 35 U.S.C. 154(b) by 50 days.

(21) Appl. No.: 10/879,124

(22) Filed: Jun. 30, 2004

(65) Prior Publication Data

US 2006/0002450 A1 Jan. 5, 2006

(51) Int. Cl.
G01K 5/00 (2006.01)
G01K 1/14 (2006.01)

(52) U.S. Cl. ...................... 374/208; 374/195; 116/216; 116/221

(58) Field of Classification Search ................ 374/208, 374/195, 189, 187, 205–207; 116/200, 216; 600/474, 549
See application file for complete search history.

(56) References Cited

U.S. PATENT DOCUMENTS

| | | | | |
|---|---|---|---|---|
| 1,691,136 A | * | 11/1928 | Schlaich | 374/189 |
| 2,034,852 A | * | 3/1936 | Wilhjelm | 374/156 |
| 2,078,993 A | * | 5/1937 | Barbier | 374/206 |
| 2,141,526 A | * | 12/1938 | Foster | 434/217 |
| 2,153,830 A | * | 4/1939 | Gordonier et al. | 374/104 |
| 2,235,252 A | | 3/1941 | Bradley | |
| 2,238,071 A | * | 4/1941 | Nazar | 374/143 |
| 2,310,503 A | * | 2/1943 | Widmer | 374/206 |
| 2,457,286 A | * | 12/1948 | Tollefsen et al. | 116/293 |
| D157,653 S | * | 3/1950 | Barkules et al. | D10/54 |
| D163,398 S | | 5/1951 | Lippert | |
| 2,558,743 A | * | 7/1951 | Ford | 374/207 |
| 2,563,749 A | * | 8/1951 | Rose et al. | 24/3.5 |
| 2,839,924 A | * | 6/1958 | Pauli | 374/138 |
| 2,988,041 A | * | 6/1961 | Schmitz, Jr. et al. | 116/292 |
| 3,266,315 A | * | 8/1966 | Shively | 374/198 |
| 3,446,181 A | * | 5/1969 | Robson | 116/250 |
| 3,810,390 A | * | 5/1974 | Neugebauer | 73/743 |
| 3,851,529 A | | 12/1974 | Andrews et al. | |
| 3,898,884 A | * | 8/1975 | Hopkins et al. | 374/189 |
| 4,030,361 A | * | 6/1977 | Fortune | 374/156 |
| 4,104,916 A | | 8/1978 | Hofer | |
| 4,137,771 A | * | 2/1979 | Young et al. | 374/207 |
| 4,595,301 A | * | 6/1986 | Taylor | 374/207 |
| D308,343 S | * | 6/1990 | Aloise et al. | D10/57 |
| 5,302,028 A | * | 4/1994 | Carey | 374/156 |
| 5,787,055 A | * | 7/1998 | Alpert | 368/223 |
| 6,033,110 A | | 3/2000 | O'Neill | |
| 6,118,735 A | * | 9/2000 | Li | 368/228 |
| D443,533 S | | 6/2001 | Siroky | |
| D448,683 S | | 10/2001 | Hui | |
| D457,822 S | | 5/2002 | Rushton | |
| D478,822 S | | 8/2003 | Kaiser et al. | |
| 2002/0189526 A1 | * | 12/2002 | Sugimoto | 116/286 |

* cited by examiner

Primary Examiner—Gail Verbitsky
(74) Attorney, Agent, or Firm—Richard C. Litman

(57) ABSTRACT

The apparel indicating thermometer has a housing, a circular dial board disposed within the housing, a pointer situated on the face of the dial board, and a thermometer movement attached to a back surface of the housing. The thermometer movement has an arbor which rotates in response to a temperature change. The arbor extends through the housing and the dial board to engage the pointer on the face of the dial board. The dial board face includes a graduated scale indicating degrees of temperature and color-coded segments representing different temperature ranges. Each color-coded segment includes depictions of appropriate pieces of clothing for each temperature range. When the arbor rotates, the position of the pointer is adjusted to indicate the temperature and the appropriate corresponding clothing. Consequently, children and individuals with cognitive disabilities may easily refer to the thermometer to make dressing decisions.

7 Claims, 3 Drawing Sheets

APPAREL INDICATING THERMOMETER

BACKGROUND OF THE INVENTION

1. Field of the Invention

The present invention relates to a thermometer, and more particularly, to a thermometer having a circular dial which is divided into color-coded segments representing different temperature ranges, each segment including drawings of clothing appropriate for the corresponding temperature range.

2. Description of the Related Art

Many children and people with cognitive disabilities rely on a parent or caregiver to select clothing which is appropriate for weather conditions. Such individuals either have difficulty reading the numbers depicted on a conventional thermometer dial or cannot associate a given numerical temperature with the weather. For these individuals, there is a need for a thermometer that not only indicates what the temperature is, but also provides an intuitive visual indication of what type of clothing is appropriate for a given temperature. Prior thermometers have not provided this information.

U.S. Design Pat. No. 443,533, issued Jun. 12, 2001 to H. Siroky, discloses a weather barometer with figures dressed in warm apparel. U.S. Pat. No. 4,104,916, issued Aug. 8, 1978 to H. P. Hofer, discloses a device for measuring the temperature of an open bottle of wine. The device includes a thermometer and a protective container for storage of the thermometer. The thermometer's temperature indicator scale is divided into color-coded segments, each segment the color of wine that should be served at temperatures within the range corresponding to the segment.

Other patents relating to thermometers include U.S. Design Pat. No. 163,398, issued May 22, 1951 to H. R. Lippert (thermometer with two figures wearing different apparel); U.S. Design Pat. No. 448,683, issued Oct. 2, 2001 to C. M. Hui (outdoor thermometer); U.S. Design Pat. No. 457,822, issued May 28, 2002 to T. L. Rushton (dial thermometer); U.S. Design Pat. No. 478,822, issued Aug. 26, 2003 to Kaiser et al. (ringing meat thermometer); U.S. Pat. No. 2,235,252, issued Mar. 18, 1941 to R. I. Bradley (temperature indicating instrument); and U.S. Pat. No. 3,851,529, issued Dec. 3, 1974 to Andrews et al. (dial thermometer).

None of the above inventions and patents, taken either singly or in combination, is seen to describe the instant invention as claimed. Thus, an apparel indicating thermometer solving the aforementioned problems is desired.

SUMMARY OF THE INVENTION

The apparel indicating thermometer of the present invention includes a housing, a circular dial board disposed within the housing, a pointer situated on the face of the dial board, and a thermometer movement attached to a back surface of the housing. The thermometer movement has an arbor which rotates in response to a temperature change. The arbor extends through the housing and the dial board to engage the pointer on the face of the dial board. The dial board face includes a graduated scale indicating degrees of temperature and color-coded segments representing different temperature ranges. Each color-coded segment includes pictures of appropriate articles of clothing for each temperature range. When the arbor rotates, the position of the pointer is adjusted to indicate the temperature and the appropriate corresponding clothing. Consequently, children and individuals with cognitive disabilities may refer to the pictures of the clothing on the dial board rather than the numbered temperature scale to make decisions about appropriate clothing for the weather.

These and other features of the present invention will become readily apparent upon consideration of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
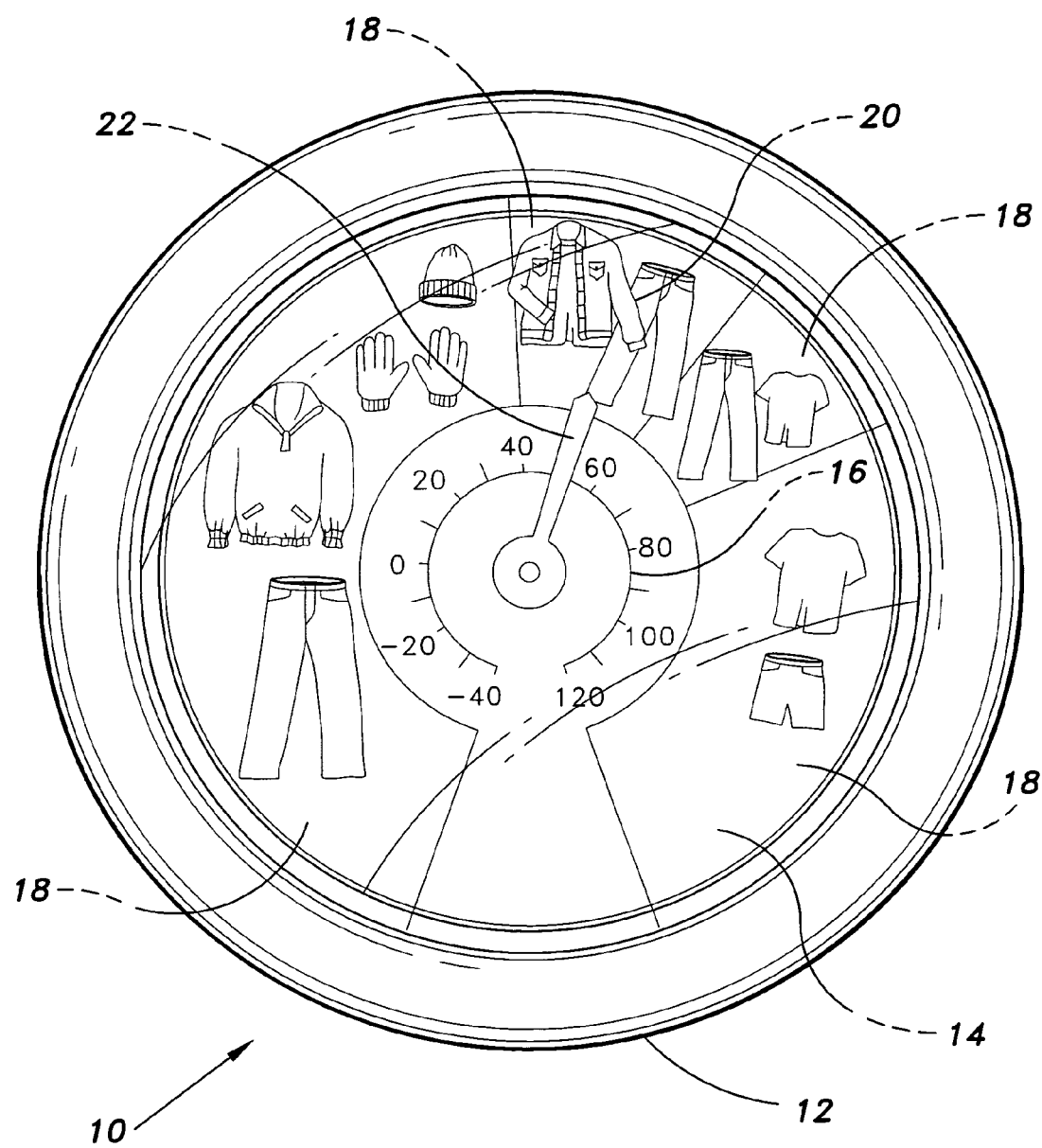
FIG. 1 is a front view of an apparel indicating thermometer according to the present invention.

The present invention relates to an apparel indicating thermometer, generally designated as 10 in the drawings. FIG. 1 depicts a front view of the thermometer 10 in which it can be seen that the thermometer 10 includes a circular housing 12 and a circular dial board 14 disposed within the housing. The dial board 14 can be made from any suitable, waterproof material. Preferably, however, the dial board 14 is made from styrene, plastic, or vinyl. The dial board 14 includes a graduated scale 16 which indicates degrees of temperature in either Fahrenheit or Celsius and covers a suitable range. The scale 16 further includes color-coded segments 18 representing different temperature ranges. Each color-coded segment 18 includes pictures, drawings or sketches 20 of articles of clothing appropriate for the temperature range represented by that segment 18. The temperature range depicted on the scale 16 may vary according to geographic location.

An exemplary color-coding scheme for the segments 18 for a temperate region might be: blue for temperatures below 40° F.; purple for temperatures between about 40° F.–60° F.; red for temperatures between about 60° F.–75° F.; and orange for temperatures above about 75° F. For colder northern climates, the temperature ranges, and accordingly the exemplary depictions of appropriate clothing, may be lower, while for warmer southern climates the temperature ranges with their corresponding clothing depictions may be higher. It will be understood that other colors may be substituted for the colors indicated above, and that the number of segments 18 and temperature boundaries for each segment may vary from those indicated above.

The housing 12 includes a circular frame 24 for receiving the dial board 14 and a transparent cover 26 disposed above the dial board 14 and which is attached to the frame 24. The frame 24 can be made from metal, plastic, or any other suitable material. The cover 26 can be made from any transparent material, including, but not limited to, plastic and glass.

Figure 2:
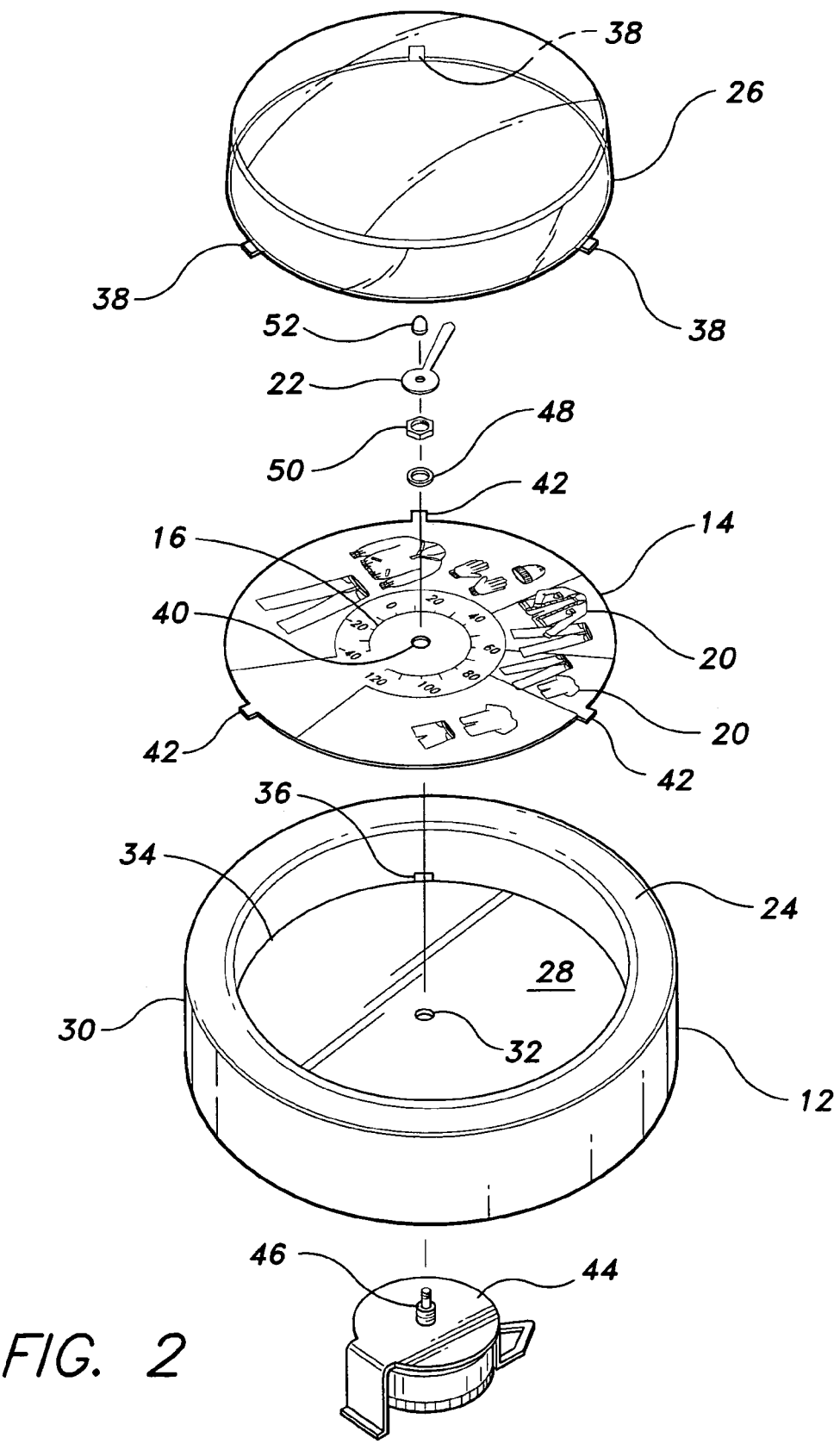
FIG. 2 is an exploded perspective view of an apparel indicating thermometer according to the present invention.

As can be seen more clearly in FIG. 2, the frame 24 includes a circular base 28 and an upright peripheral wall 30 extending from the base 28. The base 28 includes a plurality of peripheral slots 36 which are configured to receive cover tabs 38 extending from a peripheral edge of the cover 26 and dial board tabs 42 extending from a peripheral edge of the dial board 14.

A thermometer movement 44 is disposed behind the base 28 of the frame 24. While any suitable thermometer movement 44 may be utilized, a thermometer movement 44 comprising a bimetal coil, such as that disclosed in U.S. Pat. No. 6,033,110, issued Mar. 7, 2000 to T. J. O'Neill, is preferred. The thermometer movement 44 includes an upright arbor 46 which rotates when the bimetal coil within the thermometer movement 44 coils or uncoils in response to a change in temperature. The arbor 46 extends through a base central aperture 32 and a dial central aperture 40 to engage a pointer 22 disposed on the opposite side of the dial board 14. The arbor 46 can be attached to the pointer 22 by any suitable means. Preferably, a washer 48, a nut 50, and a cap nut 52 are used to secure the pointer 22 to the arbor 46. Rotation of the arbor 46 changes the position of the pointer 22 relative to the graduated scale 16. The pointer 22 may thereby cooperate with the scale 16 to visibly indicate not only the temperature as sensed by the thermometer movement 44, but also, the corresponding clothing to be worn. Thus, children and individuals with cognitive disabilities may refer to the pictures 20 of the clothing rather than the numbered temperature scale 16 to make dressing decisions.

Figure 3:
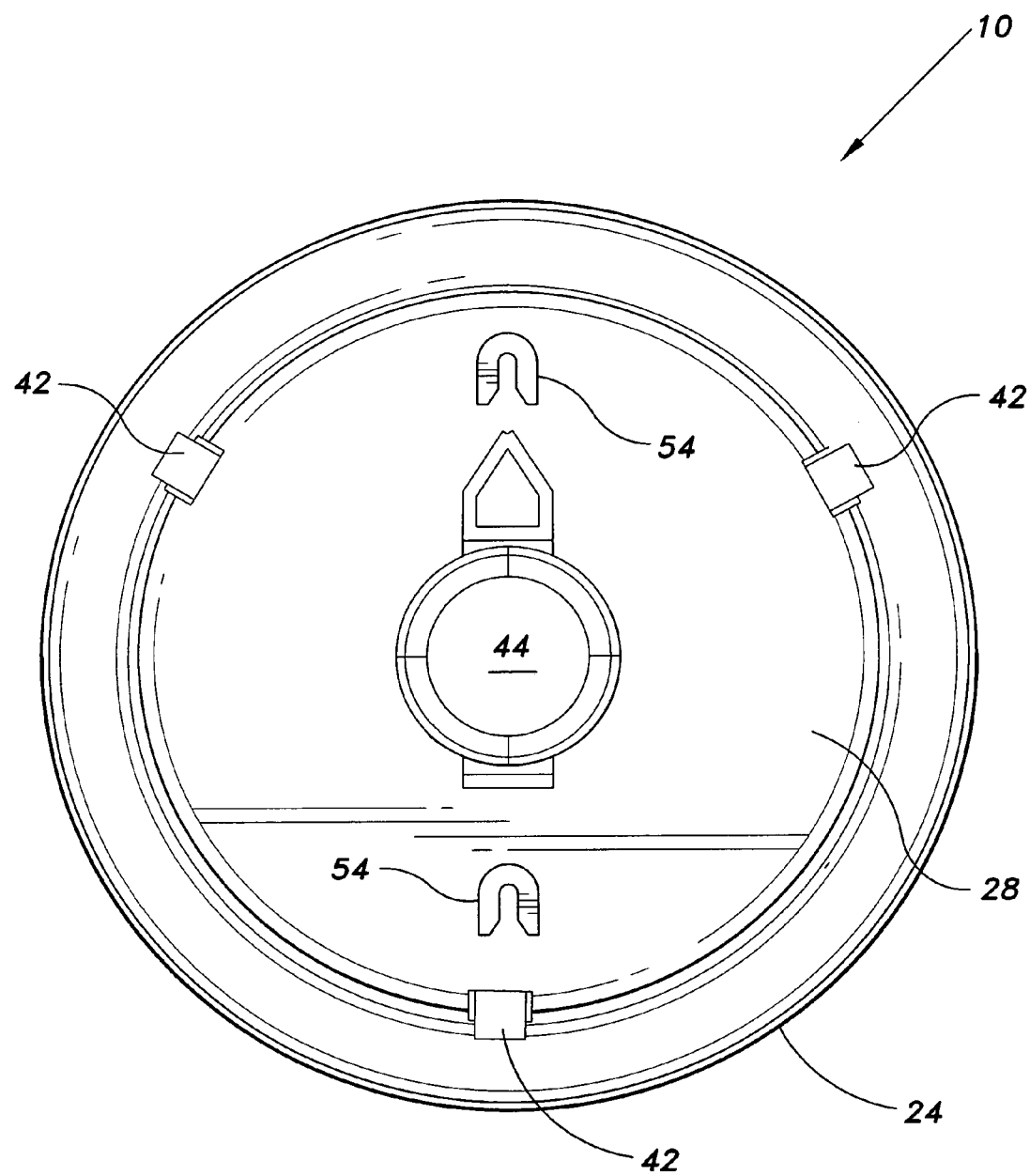
FIG. 3 is a rear view of an apparel indicating thermometer according to the present invention.

FIG. 3 depicts a rear view of the thermometer 10. As is shown, the base 28 of the frame 24 may further include mounting notches 54 to facilitate mounting the thermometer 10 to a vertical support structure.

Although the apparel indicating thermometer 10 of the present invention has been illustrated with a circular housing, it will be understood that the scope of the present invention extends to any outdoor thermometer having a dial indicator mounted over a thermometer face having color-coded temperature ranges and depictions of appropriate outdoor clothing suited to the temperature range and the region of the country.

It is to be understood that the present invention is not limited to the embodiment described above, but encompasses any and all embodiments within the scope of the following claims.

I claim:

1. An apparel indicating thermometer, comprising:
    a dial board having a central aperture defined therethrough, a front face, a rear face, and a plurality spaced from each other of dial board tabs extending from a peripheral edge;
    a graduated temperature scale defined on the front face of the dial board, the scale having a plurality of color-coded segments corresponding to outdoor temperature ranges, each of the segments having depictions of articles of clothing appropriate for the temperature range represented by said segments;
    a frame, said frame comprising a circular base having a front, a rear, a central aperture defined therethrough and a peripheral wall extending around the base, said base further including a plurality spaced from each other of peripheral slots extending therethrough and located adjacent said peripheral wall; said dial board being mounted in the frame with said dial board rear face facing said front of said base and said dial board tabs extending into said peripheral slots of said base;
    a transparent cover, said transparent cover including a plurality spaced from each other of cover tabs extending from a peripheral edge thereof;
    said cover being mounted in the frame and extending over the front face of said dial board with said cover tabs extending into said peripheral slots of said base and above the dial board tabs;
    a dial thermometer having a thermometer movement mounted at the rear of the base, an arbor extending from said movement through the aperture of said base and said dial board central aperture, and a pointer mounted on the arbor above the front face of the dial board;
    whereby rotation of the arbor in response to a change in temperature moves the pointer to a position pointing to one of the color-coded segments in order to provide a visual indication of clothing appropriate for the outdoor temperature.

2. The thermometer according to claim 1, wherein said frame includes at least one mounting notch adapted for attaching said frame to a wall.

3. The thermometer according to claim 1, wherein said dial board is made from styrene.

4. The thermometer according to claim 1, wherein said dial board is made from vinyl.

5. The thermometer according to claim 1, wherein said dial board is made from plastic.

6. The thermometer according to claim 1, wherein said graduated scale includes indicia imprinted thereon corresponding to a Centigrade temperature scale.

7. The thermometer according to claim 1, wherein said graduated scale includes indicia imprinted thereon corresponding to a Fahrenheit temperature scale.

* * * * *